United States Patent [19]

Duhan et al.

[11] Patent Number: 5,369,305
[45] Date of Patent: Nov. 29, 1994

[54] SAFETY DEVICE

[75] Inventors: Tommy Duhan, Eskilstuna; Stig-Håkan Nilsson, Torshälla, both of Sweden

[73] Assignee: General Engineering (Netherlands) B.V., Utrecht, Netherlands

[21] Appl. No.: 910,283
[22] PCT Filed: Sep. 17, 1991
[86] PCT No.: PCT/SE91/00622
  § 371 Date: Jul. 17, 1992
  § 102(e) Date: Jul. 17, 1992
[87] PCT Pub. No.: WO92/05051
  PCT Pub. Date: Apr. 2, 1992

[30] Foreign Application Priority Data

Sep. 20, 1990 [GB] United Kingdom ............... 9020533
Jul. 9, 1991 [GB] United Kingdom ............... 9114766

[51] Int. Cl.$^5$ .............................................. B60L 3/00
[52] U.S. Cl. .............................. 307/10.1; 280/735; 180/282
[58] Field of Search ............... 307/9.1, 10.1; 340/669, 340/436, 438, 440; 280/728, 734, 735; 180/271, 274, 282; 324/727, 527; 73/510, 514, 518, 517 AV, 1 D, 1 DV

[56] References Cited

U.S. PATENT DOCUMENTS

| | | | |
|---|---|---|---|
| 3,993,362 | 11/1976 | Kamins et al. | 180/103 BF |
| 4,164,263 | 8/1979 | Heintz et al. | . |
| 4,198,677 | 4/1980 | Brunner et al. | . |
| 4,672,566 | 6/1987 | Asano et al. | . |
| 4,715,003 | 12/1987 | Keller et al. | . |
| 4,765,342 | 8/1988 | Urman et al. | . |
| 4,918,262 | 4/1990 | Flowers et al. | 340/718 |
| 5,034,891 | 7/1991 | Blackburn et al. | 307/10.1 |

FOREIGN PATENT DOCUMENTS 0376024 7/1990 European Pat. Off. .
2552551 3/1985 France .
3334603 4/1985 Germany .
59-183375 10/1984 Japan .
63-29259 2/1988 Japan .

OTHER PUBLICATIONS

Electronic Design, Sep. 22nd, 1988, vol. 36 ho. 21, "Tiny Accelerometer . . . " Richard Nass.
Givare Automation Special 78, "Piezoresistiva givare" Roger Alven.
Givare Automation Special 78, "Piezoelektriska accelerometrar" Dag Hartman.

*Primary Examiner*—A. D. Pellinen
*Assistant Examiner*—Peter Ganjoo
*Attorney, Agent, or Firm*—Spencer, Frank & Schneider

[57] ABSTRACT

A safety device in a motor vehicle includes a sensor which provides an output relating to a physical quantity such as acceleration. The signal is passed to a subtracting circuit and the output of the subtracting circuit is fed to a further circuit arrangement which derives a signal value corresponding to an off-set component present in the signal, this signal value being subtracted from the original signal to provide an output which relates solely to the component of the original signal corresponding to the measured physical quantity. The output of the subtracting circuit is used to initiate the operation of the safety device such as an air-bag or seat belt pre-tensioner.

18 Claims, 2 Drawing Sheets

SAFETY DEVICE

BACKGROUND OF THE INVENTION

1. Field of the Invention

THIS INVENTION relates to a safety device and more particularly relates to a safety device which incorporates an electrical arrangement adapted to be used in combination with a sensor to activate a safety device in a motor vehicle, for example, when an accident occurs.

2Description of Related Art

It is to be understood that when a vehicle is involved in an accident it is often necessary to trigger a safety device, such as, for example, an air-bag, which may be rapidly inflated to provide a "cushion" to protect a person travelling in the vehicle, or to apply a "pre-tension" to a safety belt. A sensor is provided which senses deceleration of a predetermined nature consistent with the deceleration experienced during accident conditions, and controls the operation of the air-bag. The present invention relates to an electrical arrangement for use with such a sensor in a safety device.

SUMMARY OF THE INVENTION

According to this invention there is provided a safety device for use in a vehicle comprising a sensor, adapted to provide an electrical output corresponding to a physical quantity related to the vehicle, the output comprising a signal which includes an off-set component and a further component corresponding to the physical quantity, the signal being passed to a subtracting circuit, the output of the subtracting circuit being fed to a further circuit arrangement which is adapted to derive a signal value corresponding to the off-set component and supply the value to the subtracting circuit to subtract the signal value from the original signal supplied to the subtracting circuit, the output of the subtracting circuit initiating the operation of safety means.

A safety device in accordance with the invention may be primarily intended for use in a vehicle such as a motor car. The sensor, which is adapted to provide an electrical output corresponding to a physical quantity related to the vehicle is intended to provide a signal which can be monitored to ascertain when an accident is occurring. Thus the physical quantity may be the acceleration or deceleration of the vehicle, or may comprise the deformation of part of the outer skin of the vehicle and even may even comprise a sensor responsive to the speed of deformation of the outer part of the vehicle. Many different sensors, responsive to different physical quantities related to the vehicle have been proposed before and are known to one skilled in the art.

The signal, when it has been appropriately processed, is intended to initiate the operation of safety means within the vehicle. The safety means may comprise, for example, an air-bag or a seat belt pre-tensioner or any other safety means that it is desired to activate under accident circumstances. Thus, the safety means may, for example, disconnect a significant part of the electrical circuitry present in a motor vehicle, in order to minimise the risk that a fire may occur when the vehicle is involved in an accident.

Preferably the output of a subtracting circuit, in a digital form, is compared with a reference, by a comparator means which produce a positive output signal or a negative output signal but is dependent upon whether the output signal is greater than or less than the reference, the output being added to the total in a register, a value corresponding to the signal stored in the register being subtracted, from the original signal, by the subtracting circuit.

Advantageously the subtracting circuit is an analogue circuit, means being provided for digitising the output of the subtracting circuit before it is passed to the comparator, and means being provided for converting the signal from the register to an analogue signal before it is supplied to the subtracting circuit.

Alternatively the subtracting circuit is a digital circuit, means being provided to digitize the original signal before it is passed to the subtracting circuit.

Preferably a clock pulse generator is provided, the output of the comparator being added to the register whenever the clock pulse generator generates a pulse.

Advantageously the output of the subtracting circuit is connected to an integrating circuit and then to an operational amplifier with a capacitative feed back which produces the signal value supplied to the subtracting circuit.

Preferably the means ,generating the original signal comprises a sensor responsive to deceleration.

Advantageously the sensor comprises a wheatstone bridge comprising Piezo resistive resistors mounted to be deformed in response to sensed deceleration. The invention also relates to an arrangement of the type described above in combination with an electrically actuated safety device, the output of said arrangement actuating the safety device.

In order that the invention may be more readily understood, and so that further features thereof may be appreciated, the invention will now be described, by way of example, with reference to the accompanying drawings in which

DETAILED DESCRIPTION OF THE PREFERRED EMBODIMENTS OF THE PRESENT INVENTION

Figure 1:
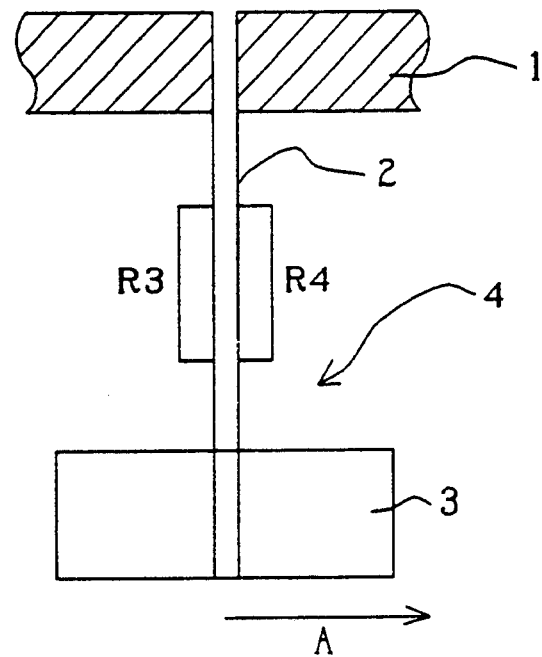
FIG. 1 is schematic view illustrating a sensor adapted to be mounted in a motor vehicle.

FIG. 1 illustrates a sensor which is responsive to deceleration of a vehicle. From a fixed part 1 of a motor vehicle a flexible substrate 2 depends, the substrate 2 carrying, at its lower end, a weight 3. The substrate 2 is formed of an insulating material. Formed on two opposed sides of the substrate 2 are two Piezo resistive resistances R3 and R4. These components form an acceleration responsive sensor 4.

A Piezo resistive resistance is a resistance in which the absolute value of the resistance varies in response to mechanical pressures or forces applied to the resistance.

Figure 2:
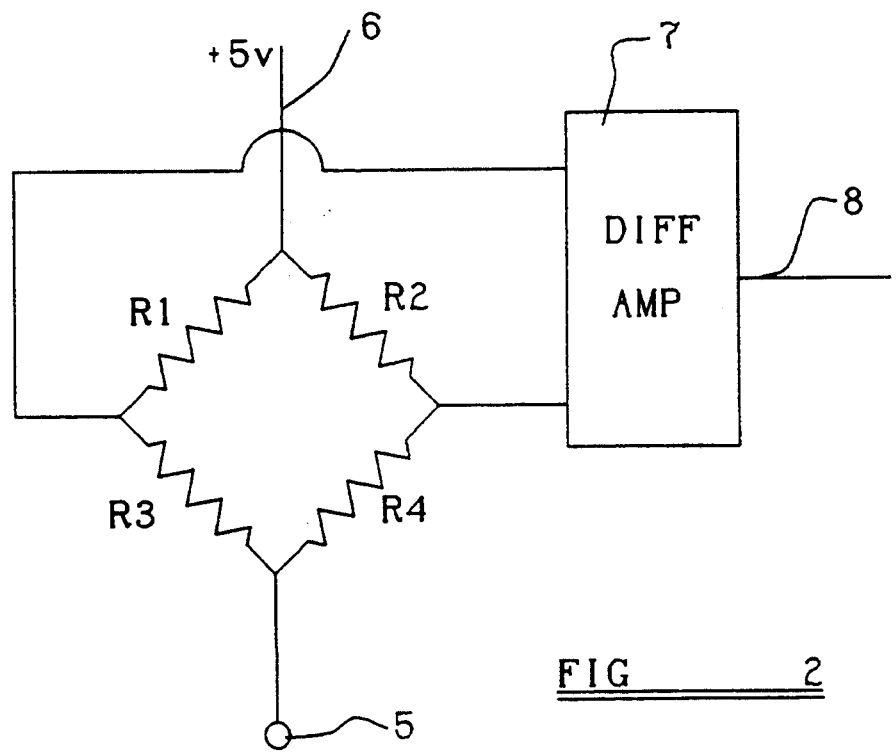
FIG. 2 is a circuit diagram of the operative parts of the sensor as shown in FIG. 1.

It can be seen that if the arrangement illustrated in FIG. 1 is mounted on a motor vehicle which is travelling in the direction of the arrow A shown in FIG. 1 and the vehicle suddenly stops the weight 3 will, due to its inertia, continue to travel to the right whereas the fixed part of the vehicle 1 will have stopped. Consequently the substrate 2 will flex serving to compress the resistance R4 and extend the resistance R3. The absolute value of the resistances R3 and R4 will thus vary. As can be seen from FIG. 2 the resistances of R3 and R4 form a "wheatstone" bridge together with other resistors R1 and R2. A voltage is applied across the "wheatstone" bridge by applying a potential between the two terminals 5 and 6. The applied potential may be 5 volts. The potential is thus applied across one diagonal of the "wheatstone" bridge. The transverse diagonal of the "wheatstone" bridge as is well known, provides the output of the bridge and leads from the transverse diagonal are connected to a differential amplifier 7. An output signal is provided from the output 8 of the differential amplifier. The value of this output depends upon the degree of deformation of the resistances R3 and R4.

The output of the differential amplifier 8 may be considered to be a voltage US. Since it may not be possible to balance the "wheatstone" bridge perfectly, especially where the devices are mass-produced, it is the case that the output voltage US from the sensor arrangement shown in FIG. 2 may contain a first part UA which is proportional to the acceleration and an off-set voltage UO. Thus, $$US = UO + UA.$$

The part of the voltage which is proportional to the acceleration does depend upon the sensitivity of the device. If CA is sensitivity then $$UA = CA.a,$$

where a is acceleration.

In a typical arrangement as described above, UO may be up to 50 mV and CA may be of the order of 1 mV/G where G is the normal acceleration provided by gravity. A typical measuring range is + or −50 g so that UA may be of the order of 50 mV.

Both UO and CA do, however, vary. UO is a function of temperature and time and varies with each individual sample. Similarly, CA is a function of temperature and the individual sample. Changes with time are, however, only relevant over a period of years and changes in sensitivity are approximately 25 per cent per 100° C. change in temperature.

The present invention contemplates that it would be possible to compensate for the off-set voltage UO by preparing a signal which is effectively the average of the signal US over a relatively long period of time, and subtracting that signal from the instantaneous value of US. For most of the time this output would, of course, be zero. However, when a deceleration occurs, and the component of the output voltage US which is dependent upon acceleration, namely UA appears, then the output would be that signal UA.

Figure 3:
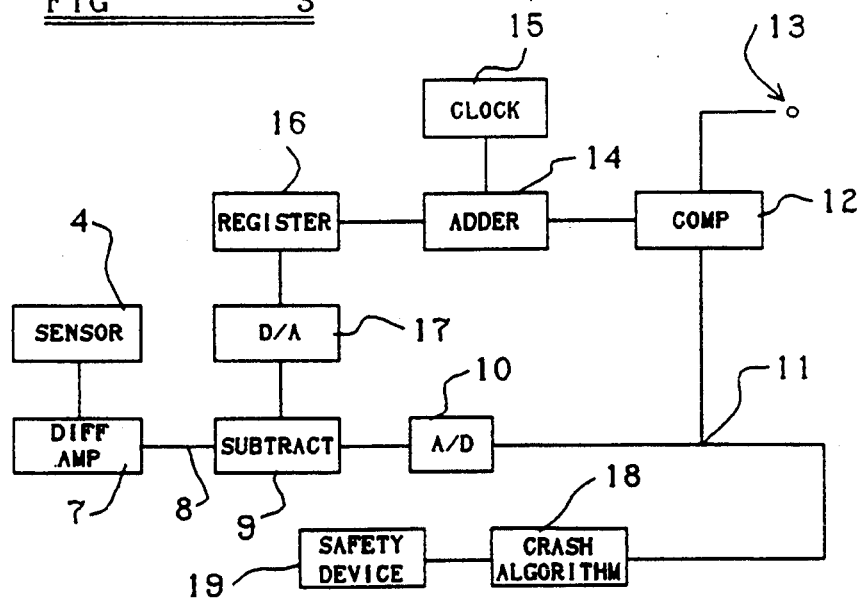
FIG. 3 is a block diagram of a control circuit for a safety device incorporating the sensor of FIGS. 1 and 2.

Referring now to FIG. 3, the sensor 4 and the differential amplifier 7 are illustrated, and the output from the differential amplifier 7 is fed to a subtracting circuit 9. The output of the subtracting circuit is fed to an analogue to digital converter 10. The output of the analogue to digital converter 10 is fed to a node 11. The node 11 is connected as one input to a comparator 12, the other input of which is connected to a voltage reference 13 which provides a reference of zero volts. The output of the comparator is adapted to be zero if the potential present on the node 11 is zero, to be minus 1 if the voltage present on the node 11 is less than zero and plus one if the voltage present at the node 11 is greater than zero. The output of the comparator is fed to an adder circuit 14 which is controlled by means of a clock 15 so that the adder adds the output of the comparator 12 to a total contained within a register 16 every time the clock gives a clock pulse.

The output of the register 16 is fed to a digital to analogue converter 17 and thence to the subtracting circuit 9, where an analogue signal equivalent to the number stored in the register is subtracted from the output of the differential amplifier.

The node 11 is connected to a signal processing circuit 18 which applies a crash algorithm to the signal. The signal is thus compared with predetermined signal patterns and amplitudes expected to arise under accident circumstances. If the signal does compare with a profile expected to arise under accident conditions a safety device 19 which is connected to the processing circuit 18, such as an air-bag is activated.

It is to be appreciated that in operation of the arrangement of FIG. 3 the differential amplifier 7 will provide, on its output 8, an ambient signal which is equal to the off-set voltage. This signal is fed to the subtracting circuit 9 and thence to the analogue to digital converter 10. If this signal is positive, the output of the comparator 12 will be plus one and each time the clock 15 generates a pulse, the number present in the register will increase by one. Each time the number in the register 16 increases by one, an equivalent analogue value is subtracted from the signal applied to the subtracting 9 through the output 8 from the differential amplifier 7. Thus, eventually, a situation is reached where the signal supplied from the register to the subtracting circuit is equal to the off-set voltage UO, and thus the output from the subtracting circuit 9 is zero, assuming a steady state condition. In this situation the number present in the register 16 will not be altered on each clock pulse 15.

Should the sensor be subjected to accident conditions, a significant signal will pass from the differential amplifier 7 through the output 8 to the subtracting circuit 9. This increase of signal will, of course, be fed to the comparator 12 resulting in the adder 14 commencing to add to the total present in the register 16. However, the clock rate is so selected that the response is not instantaneous, and thus the increased signal occasioned by the activation of the sensor 4 is passed, from the node 11, to the signal processing circuit 18, where it is effectively determined if the signal is or is not representative accident conditions. If the signal is representative of accident conditions, the safety device 19 is activated.

It is to be appreciated that since the clock 15 and the adder 14 are provided to ensure that there is a certain delay between the arrival of a increased signal at the subtracter 9, and a compensating subtraction being made, when the arrangement illustrated in FIG. 3 is first activated there will be a certain period of time before the arrangement reaches its ordinary or quiescent state. It may be preferred, therefore, to arrange that the clock 15 terminates operation whenever the motor vehicle in which the arrangement is fitted is inoperative, but the register 16 stores the number that was previously present within the register. Thus, when the device is "switched on" the register will already contain approximately the correct number, enabling the arrangement to reach the quiescent state relatively rapidly. Alternatively, the clock may be adjusted so that when the arrangement is first switched on, the clock runs at a very rapid pace for a predetermined number of clock pulses to bring the arrangement into the quiescent state, the clock then running at a normal, slower rate.

It is to be appreciated that since the output of the subtracting circuit 9 is normally zero, the analogue to digital converter 10 need only accurately convert alterations in the signal, which will be of a relatively low absolute size, thus meaning that an inexpensive analogue to digital converter can be utilised. Also, the signal processing unit 18 containing the crash algorithm can process a signal which does not contain any off-set information, but contains purely significant information derived from the sensor.

Figure 4:
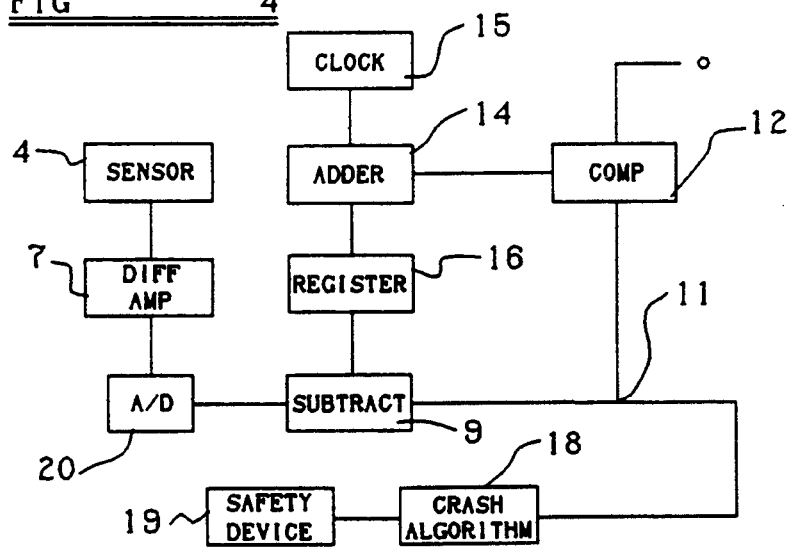
FIG. 4 is a block diagram, corresponding to FIG. 3, but illustrating a modified embodiment.

Whilst it is preferred to perform the subtraction as represented by the subtracter 9 in the analogue part of the arrangement, as shown in FIG. 4 it is possible to pass the output of the differential amplifier 7 through an analogue to digital converter 20, the output of that converter 20 being fed to the subtraction circuit 9. The subtraction is then effected in a digital manner rather than in an analogue manner. The remaining components of the arrangement illustrated in FIG. 4 are the same as the correspondingly numbered components of FIG. 3.

Figure 5:
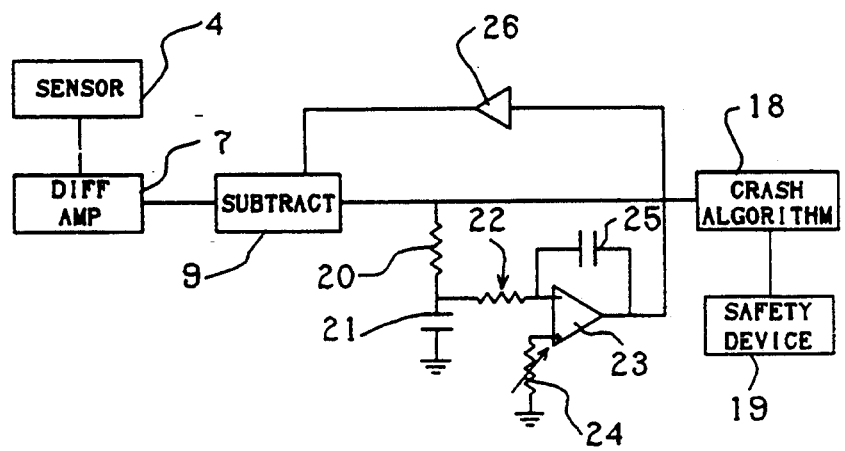
FIG. 5 is a circuit diagram illustrating another embodiment.

Referring now to FIG. 5 of the accompanying drawings it is to be appreciated that whilst the invention has been described above with reference to digital embodiments, an embodiment of the invention may be formed in an analogue manner. In the embodiment of FIG. 4 the sensor 4 and differential amplifier 7 are as described above. However, the output of the differential amplifier is fed directly to a subtracting circuit 9. The output of the subtracting circuit 9 is connected by means of a delay circuit constituted by a resistance 20 connected to a capacitance 21 which is in turn connected to earth. An output is taken from the node between the resistance 20 and the capacitors 21 and is passed through resistance 22 to the negative input of an operational amplifier 23. A positive input of the operational amplifier is connected by means of an adjustable resistance 24 to earth. A feed-back capacitance 25 is connected between the output of the operational amplifier and the negative input. The output of the operational amplifier 23 is connected to an inverter 26. The combination of components described above serves to provide a signal at the output of the inverter 26 which is equivalent to the off-set voltage supplied from the differential amplifier 7 to the subtracting circuit 9. This output signal is fed to the subtracting circuit 9, where it is subtracted from the output of the differential amplifier to provide a resultant signal which, in the quiescent state is zero. A stable situation then obtains until a sensed signal is provided to the input of the subtracting circuit 9. Such a signal then passes to the crash algorithm circuit 18 and the associated safety device 19.

We claim:

1. A safety apparatus for use in a motor vehicle, comprising:
   sensor means for sensing deceleration of the vehicle and producing a first signal having an off-set component and a deceleration component related to a deceleration of the vehicle;
   a subtracting circuit, coupled to the first signal and to a second signal, to produce a difference signal related to a difference between the first and second signal;
   a comparator, coupled to the difference signal and to a reference signal, for comparing the difference signal to the reference signal and producing a third signal, the third signal being a positive signal when the difference signal is greater than the reference signal and being a negative signal when the difference signal is less than the reference signal;
   a register, coupled to the third signal, for providing the second signal which is related to a total count of positive and negative signals, the register being responsive to a clock signal for adding the third signal to the total count when the third signal is a positive signal and subtracting the third signal from the total count when the third signal is a negative signal; and
   a signal processing circuit for processing the difference signal to determine whether to activate a safety device.

2. The safety apparatus according to claim 1, wherein the second signal corresponds to the off-set component of the first signal.

3. The safety apparatus according to claim 1, wherein the clock signal runs at a first predetermined rate for a first predetermined period of time when the safety apparatus is first turned on, and a second predetermined rate after the first predetermined period of time.

4. The safety apparatus according to claim 1, further comprising:
   an analog-to-digital converter, coupled to the difference signal, for converting the difference signal from an analog signal to a digital signal; and
   wherein the comparator is coupled to the analog-to-digital converter and responsive to the digital difference signal produced by the analog-to-digital converter to produce the third signal.

5. The safety apparatus according to claim 4, further comprising:
   a digital-to-analog converter, coupled to an output of the register, for producing the second signal.

6. The safety apparatus according to claim 1, further comprising:
   an analog-to-digital converter, coupled to the first signal, for converting the first signal from an analog signal to a digital signal; and
   wherein the subtracting circuit is coupled to the analog-to-digital converter and responsive to the digital first signal to produce the difference signal.

7. The safety apparatus according to claim 1, wherein the sensor means is formed from a wheatstone bridge including piezo resistive resistors configured to sense the deceleration of the vehicle.

8. The safety apparatus according to claim 1, wherein the register stores the total count when the vehicle is inoperative.

9. The safety apparatus for use in a vehicle, comprising:
   a sensor for sensing deceleration of the vehicle and producing a sensor signal, the sensor signal having an off-set component and deceleration component related to a deceleration of the vehicle;
   a compensator, coupled to the sensor signal, for producing a compensated signal by substantially removing the off-set component of the sensor signal so that the compensated signal corresponds to the deceleration component of the sensor signal, the compensator including,
   a register for storing a first value corresponding to the off-set component; and
   a difference circuit, coupled to the sensor and the register, for producing the compensated signal based on a difference between the sensor signal and a first signal related to the first value; and a signal processing device for processing the compensated signal to determine whether to activate a safety device.

10. The safety apparatus according to claim 9, further comprising:
 a comparator, coupled to the compensated signal and a reference signal, for producing a positive signal when the compensated signal is greater than the reference signal and for producing a negative signal when the compensated signal is less than the reference signal;
 a clock circuit for producing clocking pulses; and
 an adder circuit, coupled to the compensated signal and responsive to the clocking pulses, for adding the positive signal to the first value stored in the register and for subtracting the negative signal from the first value stored in the register.

11. The safety apparatus according to claim 10, further comprising:
 an analog-to-digital converter, coupled to the difference circuit, for converting the compensated signal from an analog signal to a digital signal;
 wherein the comparator is responsive to the digital compensated signal converted by the analog-to-digital connector for producing the positive signal and the negative signal; and
 wherein the signal processing device is responsive to the digital compensated signal for determining whether to activate the safety device.

12. The safety apparatus according to claim 11, wherein a digital-to-analog converter is coupled to the register for converting a signal corresponding to the first value stored in the register from a digital signal to an analog signal to produce the first signal corresponding to the first value.

13. The safety apparatus according to claim 10, wherein the clock circuit produces clock pulses at a first predetermined rate when the safety apparatus is first turned on for a first predetermined period of time, and produces clock pulses at a second predetermined rate after the first predetermined period of time.

14. The safety apparatus according to claim 10, further comprising:
 an analog-to-digital converter, coupled to the sensor, for converting the sensor signal from an analog signal to a digital signal; and
 wherein the difference circuit is responsive to the digital sensor signal converted by the analog-to-digital converter to produce the compensated signal.

15. The safety apparatus according to claim 10, wherein the sensor includes a wheatstone bridge having piezo resistive resistors configured to sense the deceleration of the vehicle.

16. A method for compensating a sensor signal of a safety apparatus for a vehicle, the method comprising the steps of:
 producing the sensor signal, the sensor signal having an off-set component and a deceleration component related to a deceleration of the vehicle;
 subtracting a first signal from the sensor signal to produce a difference signal;
 comparing the difference signal to a reference signal to produce a third signal, the third signal being a positive signal when the difference signal is greater than the reference signal and being a negative signal when the difference signal is less than the reference signal;
 generating a clock signal having clock pulses;
 generating a total count in response to the clock pulses to produce the first signal, the total count based on the third signal wherein the third signal is added to the total count when the third signal is a positive signal and subtracting the third signal from the total count when the third signal is a negative signal; and
 processing the difference signal to determine whether to activate a safety device.

17. The method according to claim 16, further comprising the steps of generating clock pulses at a first predetermined rate for a first predetermined period of time when the safety apparatus is first turned on, and producing clock pulses at a second predetermined rate after the first predetermined period of time.

18. The method according to claim 16, further comprising the step of storing the total count when the vehicle is inoperative.

* * * * *